(No Model.) 2 Sheets—Sheet 1.

J. LEE.
BREAD CRUMBING MACHINE.

No. 540,553. Patented June 4, 1895.

Witnesses:

Inventor
Joseph Lee
By Lynch and Terrell
Attorneys.

(No Model.) 2 Sheets—Sheet 2.

J. LEE.
BREAD CRUMBING MACHINE.

No. 540,553. Patented June 4, 1895.

Witnesses
C. M. Sweeney.
Geo. B. Whiting.

Inventor
Joseph Lee
Attorney.

UNITED STATES PATENT OFFICE.

JOSEPH LEE, OF AUBURNDALE, MASSACHUSETTS.

BREAD-CRUMBING MACHINE.

SPECIFICATION forming part of Letters Patent No. 540,553, dated June 4, 1895.

Application filed August 21, 1894. Serial No. 520,912. (No model.)

*To all whom it may concern:*

Be it known that I, JOSEPH LEE, a citizen of the United States, residing at Auburndale, in the county of Middlesex and State of Massachusetts, have invented certain new and useful Improvements in Bread-Crumbing Machines; and I do hereby declare the following to be a full, clear, and exact description of the invention, such as will enable others skilled in the art to which it appertains to make and use the same.

My invention relates to machines for crumbing bread and is intended more particularly for use in hotels or restaurants, where a large quantity of bread crumbs are used in cooking although my machine will be found to be useful in private families where any considerable amount of bread is to be crumbed.

By the use of my invention the scraps and crusts of bread which come from the table can be readily crushed and crumbed, thereby effecting a great saving in establishments where the bread waste from the table is considerable.

My invention is of such a character also that fresh bread can be readily crumbed and reduced to the proper fineness, a matter of some difficulty where the bread is new and inclined to roll rather than to crumb, when crushed.

I will now describe my invention in detail, having reference to the accompanying drawings, and will point out the novel features of the same more particularly in the claims, appended to this specification.

Figure 1:
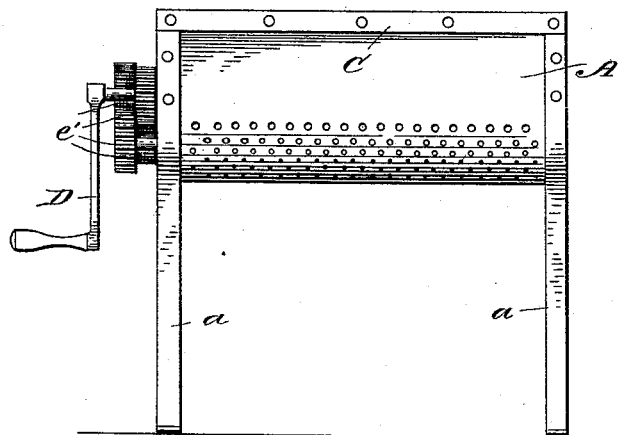
Figure 2:
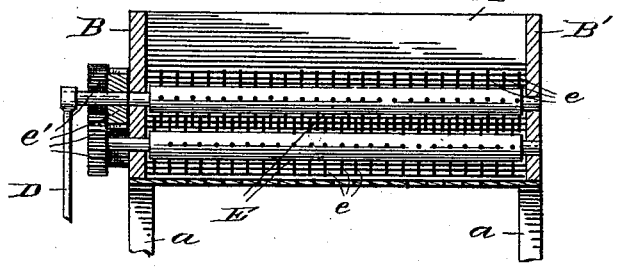
Figure 3:
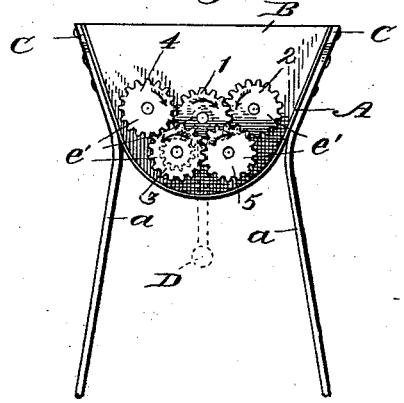
Figure 4:
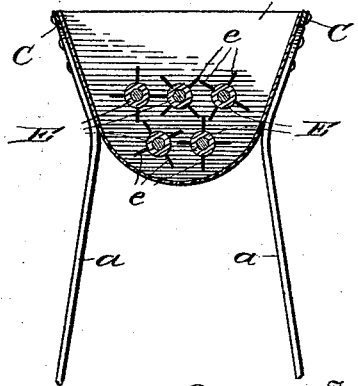
Figure 5:
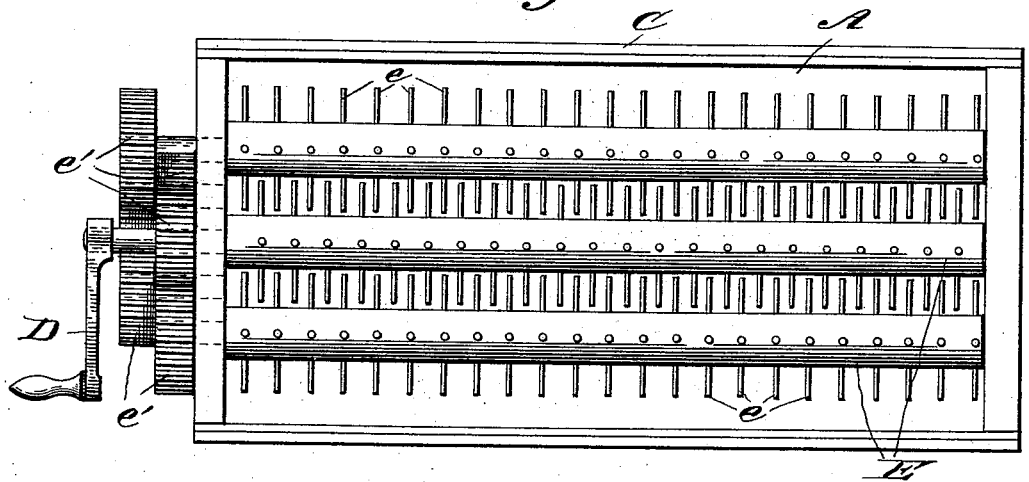
Figure 6:
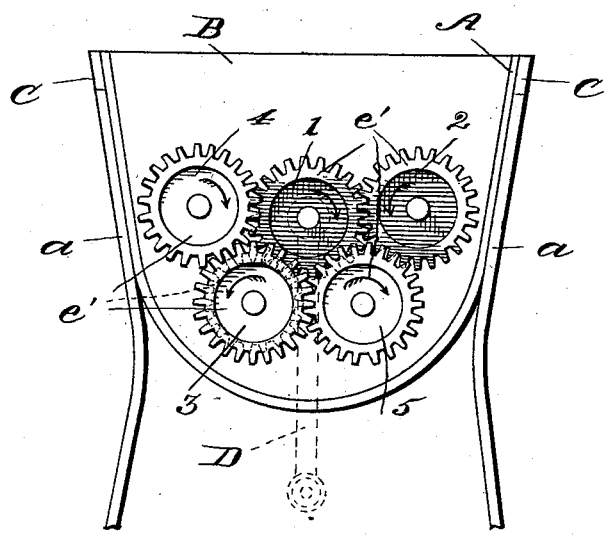

In the drawings, Figure 1 is a side elevation of my improved machine. Fig. 2 is a central vertical sectional view. Fig. 3 is an end view, and Fig. 4 is a transverse vertical sectional view. Fig. 5 is an enlarged plan view to show the arrangement of the crumbing-shafts and driving-gears. Fig. 6 is an enlarged end view, showing the relation of the driving-gears to one another.

Referring to the drawings by letter, A denotes the body or trough of my machine, which I preferably form of sheet metal. Said trough A has a rounded bottom which is perforated as shown, and at each end of the trough are supporting legs $a$. The sides of the trough A flare outwardly slightly so that the trough has an inverted cone shape in transverse section. The ends of the trough A are closed by means of wooden end pieces B, B' to which the edges of the sheet metal trough A are secured by rivets or in any other suitable manner. Along the upper edges of the sides of the trough A I secure iron straps C which give greater rigidity to the structure.

Journaled in the end pieces B, B' are a series of shafts E, preferably five in number and arranged in two horizontal rows (see Fig. 3) with three shafts in the upper and two in the lower row. The said shafts E are provided with radial crumbling or tearing fingers $e$ which are arranged so as that the said fingers $e$ of the several shafts E mesh with one another. The ends of said shafts E project through the end piece B and are provided with pinions $e'$ which engage with one another so as that the shafts E are rotated when power is applied to the middle shaft of the upper series.

By referring to the arrows found upon the drawings the direction of rotation of the several shafts will be apparent. The middle pinion of the upper series it will be observed, meshes with the pinion on the right in the upper series (Figs. 2 and 6) and the pinion shown in dotted lines on the shaft to the left in the lower series. The two pinions of the lower series mesh with each other and the upper and lower pinions on the left of each series mesh with each other. In order that the system of gearing may be clear I have referred to the pinions by numbers (1, 2, 3, 4 and 5) and will trace the meshing of the pinions and their relations to each other by the numerals applied to each pinion. Pinions 1, 2 and 3 mesh with one another, pinions 3 and 4 mesh, and pinions 3 and 5 mesh. It is obvious that any other source of power as a pulley secured to said shaft might be used if desired.

The gearing which connects the several shafts E is so arranged that the two outer shafts of the upper horizontal row rotate from the center of the trough outwardly, as is indicated by the arrows in Fig. 3, and consequently in opposite directions; while each of the two lower shafts rotates in the same direction as the outer shaft in the upper row just above it. By this arrangement of gearing the material to be crumbed is drawn down into the trough A by the crumbing fingers e of the two outer shafts in the upper row and is then seized by the crumbing fingers e of the two lower shafts and forced to the bottom of the trough, and if the crumbs are fine enough they pass through the perforations in the bottom of trough A and fall in a suitable receptacle. If the pieces of bread are too coarse to pass through the perforated bottom they are carried around by the two lower shafts E and thrown up to the central shaft and one of the outer shafts to be carried to the top of the trough again and thence to the crumbing action of the fingers e a second time and so on until the requisite fineness is attained.

The operation of the machine is apparent. The material being thrown into the trough and the shafts started the bread is seized by the tearing fingers and drawn into the machine where it is acted upon by the crumbing action of the fingers until reduced to the required fineness.

It will be seen that owing to the disposition of the shafts in the trough the material has no chance to escape the action of the crumbing or tearing fingers but is kept passing through the machine continually until thoroughly crushed.

What I claim is—

1. In a bread crumbing machine, the combination with a trough having a curved perforated bottom and diverging sides, shafts running lengthwise said trough near the bottom thereof, said shafts being placed in two horizontal series, radially disposed intermeshing crumbing fingers on said shafts, driving pinions, carried by said shafts, which mesh with one another so that the outer shafts on one side of each horizontal series revolve in an opposite direction from the shafts on the other side, substantially as described.

2. In a bread crumbing machine, the combination with the trough A formed of a single piece of sheet metal and having a curved perforated bottom and diverging sides, of the stiffening side strips C riveted to the upper edges of said diverging sides, the supporting legs a secured to said trough, two sets of horizontally arranged shafts running lengthwise said trough near the bottom, intermeshing crumbing fingers on said shafts and meshing driving pinions at the outer ends of said shafts so disposed that when power is applied to drive said shafts the outer shafts on one side of each series will revolve in the same direction and oppositely from those on the other side.

3. In a crumbing machine, the combination with the trough A formed of sheet metal and having a perforated bottom, outwardly flaring sides, and vertical end pieces B, of the series of horizontal shafts E running lengthwise the trough A near the bottom thereof and journaled in the end pieces B, radially disposed intermeshing crumbing fingers e on said shafts E and driving pinions e′ carried at the outer ends of shafts E which project through one of the end pieces B, said driving pinions meshing with one another and being so arranged with relation to one another that when power is applied to drive the shafts the outer shafts on one side of each series will revolve in the same direction and oppositely from the outer shafts on the other side, and a driving crank D secured to one of said shafts E.

In testimony whereof I affix my signature in presence of two witnesses.

JOSEPH LEE.

Witnesses:
SAMUEL P. THRASHER,
JOHN C. KENNEDY.